United States Patent Office 3,310,561
Patented Mar. 21, 1967

3,310,561
6-AMMONIOPURINIDES
Alfred R. Bader, Milwaukee, Wis., assignor to Aldrich Chemical Company, Inc., Milwaukee, Wis., a corporation of Wisconsin
No Drawing. Filed Aug. 5, 1965, Ser. No. 477,585
5 Claims. (Cl. 260—252)

This invention relates to novel compounds and to processes of producing such compounds. More particularly, this invention relates to novel 6-ammonio-purinides.

According to this invention, there are provided compounds of the following general formula:

(1) 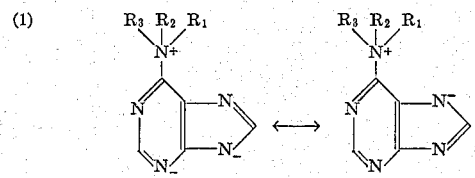

where $R_1$, $R_2$ and $R_3$ are each selected from the group consisting of lower alkyl, such as methyl, ethyl, propyl, isopropyl, butyl, hexyl and the like; lower alkenyl, such as vinyl, allyl, isopropenyl, butenyl, butadienyl and the like; and lower cycloalkyl such as cyclopropyl, cyclobutyl, cyclopentyl and cyclohexyl.

The compounds of this invention are prepared by the method of contacting compounds of the following general formula with a suitable acid binding agent:

(2) 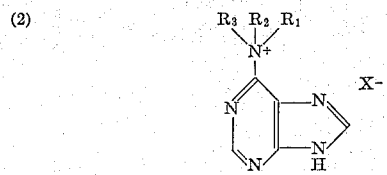

where $R_1$, $R_2$ and $R_3$ have the significance previously assigned and X is selected from the group consisting of chlorine and bromine.

This method may be carried out by treating the compounds of general Formula 2 with sodium hydroxide, sodium or potassium carbonate or a tertiary amine such as triethylamine.

A more convenient method of contacting the intermediate compounds of Formula 2 with an acid binding agent may be carried out by passing a solution of the compounds through an ion exchange column containing an ion exchange resin, in its basic form. After passing the solution through the column, the solvent is removed by evaporation or distillation leaving as the residue the compounds of this invention. These are surprisingly stable materials which may be further purified by recrystallization from water or an organic solvent.

Preparation of the intermediate compounds of Formula 2 is carried out by reacting in a suitable solvent, 6-chloro- or 6-bromopurine with a tertiary amine of the general formula $NR_1R_2R_3$, where $R_1$, $R_2$ and $R_3$ have the significance previously assigned. This reaction may be represented by the following equation:

(3) 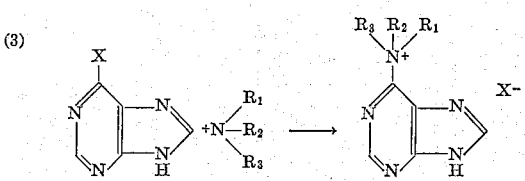

where $R_1$, $R_2$, $R_3$ and X have the significance assigned above.

Solvents suitable for carrying out the reaction of Equation 3 include methanol, ethanol, acetone and N,N-dimethylformamide.

Examples of tertiary amines which may be employed to form the intermediate reaction products include trimethylamine, triethylamine, tributylamine, methyldiethylamine, N,N-diethylcyclohexylamine, allyldimethylamine, N-allylcycloproplyamine, N-methylcyclopentylamine and ethyldiisopropylamine.

The compounds of this invention are useful as chelating agents in the recovery of trace metals such as cobalt.

The invention will now be illustrated by, but is not intended to be limited to, the following examples:

EXAMPLE 1

Purin-6-yltrimethylammonium chloride

In a 5 liter, 3-necked flask fitted with a Dry Ice condenser, gas inlet tube, and traps, and immersed in a Dry Ice 2-propanol bath, 425 g. of 6-chloropurine was added to 2.75 liters of N,N-dimethylformamide. A stream of anhydrous trimethylamine was passed through the solution for 6 hours. A solid originally suspended in the reaction mixture slowly redissolved, and then precipitation of the product took place. The reaction was allowed to warm to room temperature and left overnight. The precipitate was filtered off, washed with dimethylformamide and ether, and dried in a vacuum oven at 45° overnight. Yield 515.5 g. of a crude product. The material was purified by dissolving it in cold water and precipitating it with acetone.

EXAMPLE 2

6-(trimethylammonio)-purinide

A solution of 170 g. of purin-6-yltrimethylammonium chloride, produced as in Example 1, in 1 liter of water was passed through an ion exchange column packed with 1.5 liters of an ion exchange resin in its hydroxyl form. The column was then washed thoroughly with water. The combined eluates were then evaporated to drying in vacuo at 50°. The crude product was recrystallized from water and dried in vacuo over phosphorus pentoxide to yield 112 g. of a white crystalline material, M.P. 190–192°.

Analysis.—Calcd. for $C_8H_{11}N_5$ (177.21): C, 54.22; H, 6.26; N, 39.52. Found: C, 54.30; H, 6.20; N, 39.49.

Various changes and modifications of the invention can be made and, to the extent that such variations incorporate the spirit of this invention, they are intended to be included within the scope of the appended claims.

What is claimed is:

1. A compound of the formula

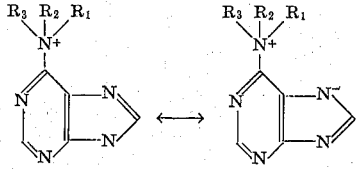

where $R_1$, $R_2$ and $R_3$ are each selected from the group consisting of lower alkyl, lower alkenyl and lower cycloalkyl.

2. The crystalline compound, 6-(trimethylammonio)-purinide.

3. The process of preparing a compound of the formula

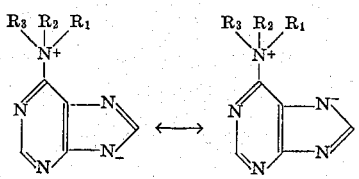

where $R_1$, $R_2$ and $R_3$ are each selected from the group consisting of lower alkyl, lower alkenyl and lower cycloalkyl comprising contacting compounds of the general formula

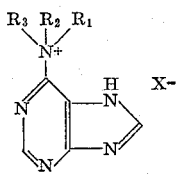

where $R_1$, $R_2$ and $R_3$ have the same significance as above and X, is selected from the group consisting of chlorine and bromine, with an acid binding agent.

4. The process of preparing 6-(trimethylammonio)-purinide comprising contacting purin-6-yltrimethylammonium chloride with an acid binding reagent, selected from the group consisting of sodium hydroxide, sodium carbonate, potassium carbonate and triethylamine.

5. The process of preparing crystalline 6-(trimethylammonio)-purinide comprising passing an aqueous solution of purin-6-yltrimethylammonium chloride through an ion exchange resin in its basic form and subsequently removing the water.

No references cited.

ALEX MAZEL, *Primary Examiner.*

MARY O'BRIEN, *Examiner.*